March 26, 1963  F. E. OBERMAIER  3,082,955
SELECTIVE AUTOMOTIVE VACUUM CONTROL VALVE
Filed Dec. 17, 1957  4 Sheets-Sheet 1
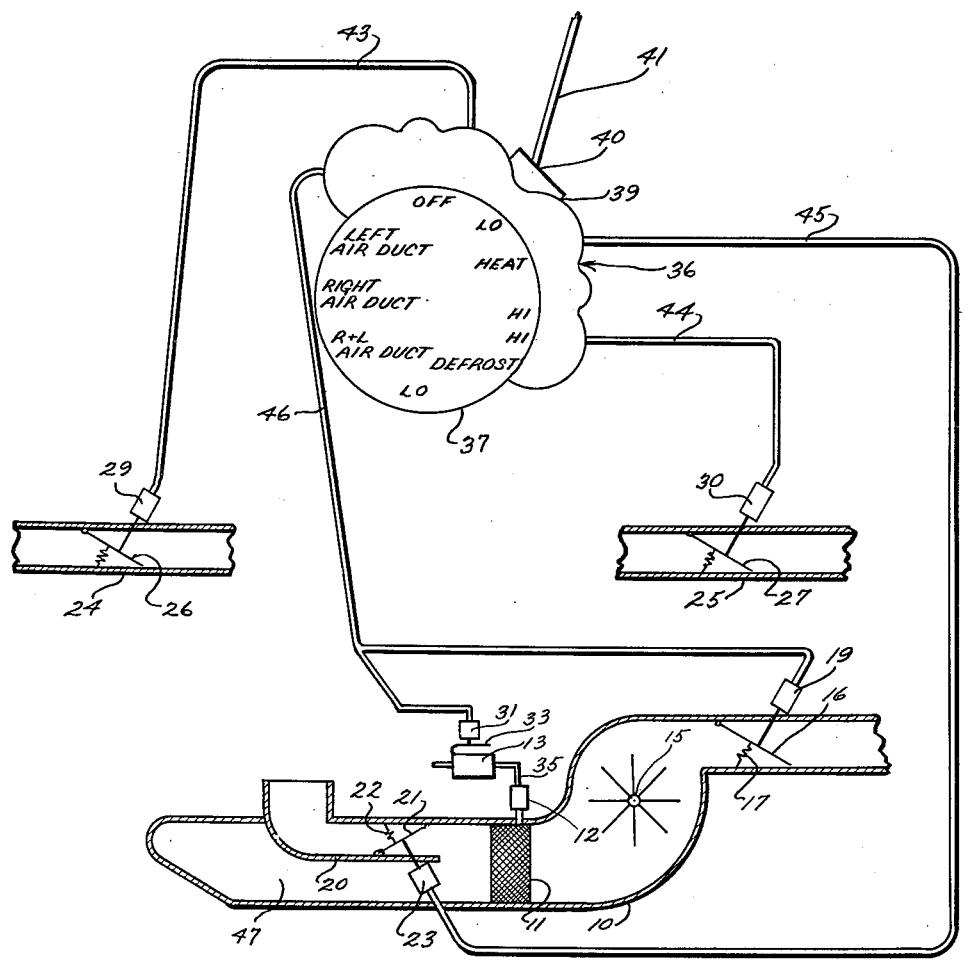
Inventor
FRANK E. OBERMAIER March 26, 1963 F. E. OBERMAIER 3,082,955
SELECTIVE AUTOMOTIVE VACUUM CONTROL VALVE
Filed Dec. 17, 1957 4 Sheets-Sheet 2
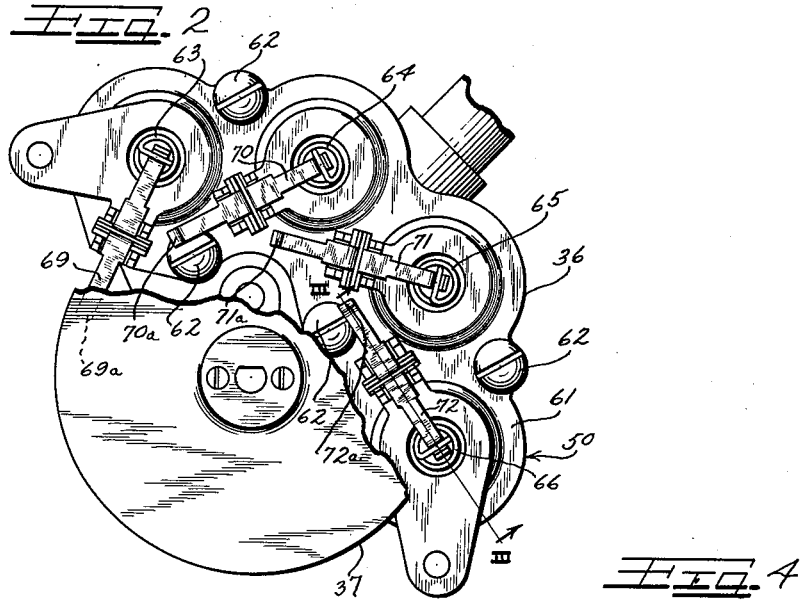
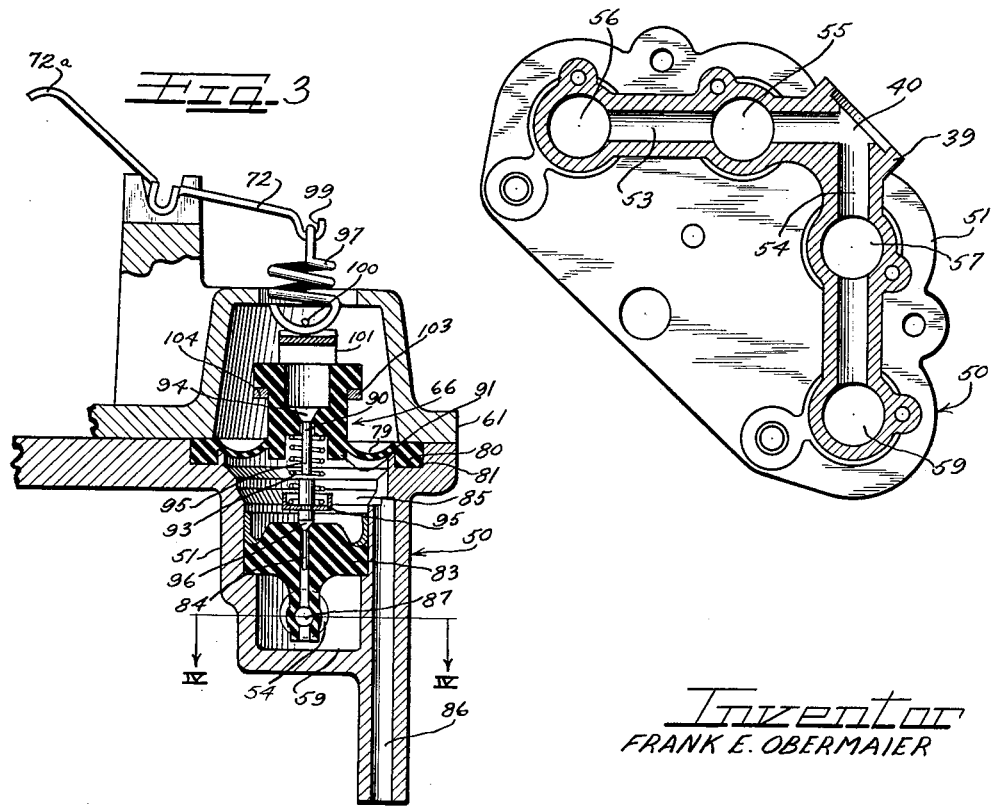
Inventor
FRANK E. OBERMAIER March 26, 1963  F. E. OBERMAIER  3,082,955
SELECTIVE AUTOMOTIVE VACUUM CONTROL VALVE
Filed Dec. 17, 1957  4 Sheets-Sheet 3
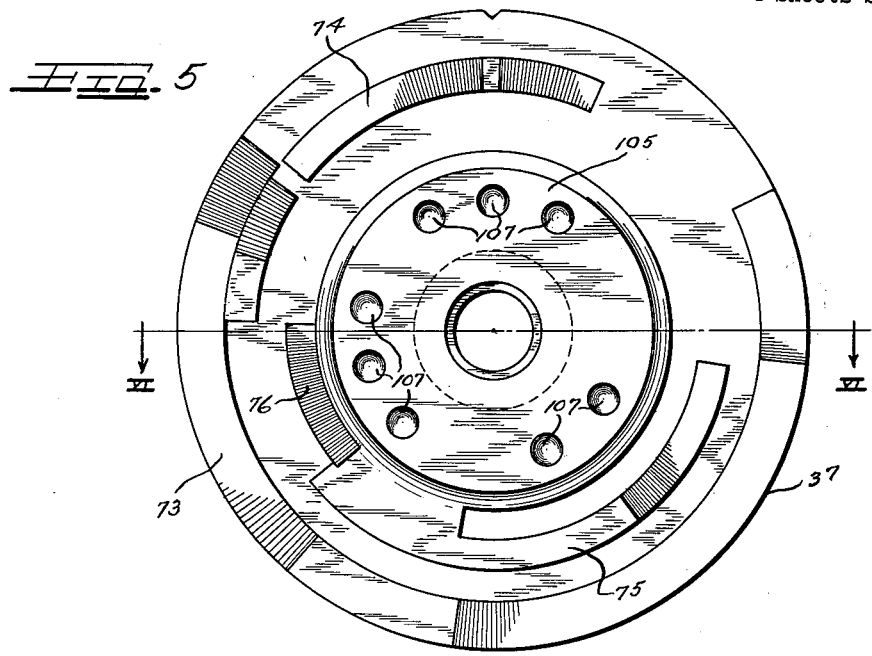
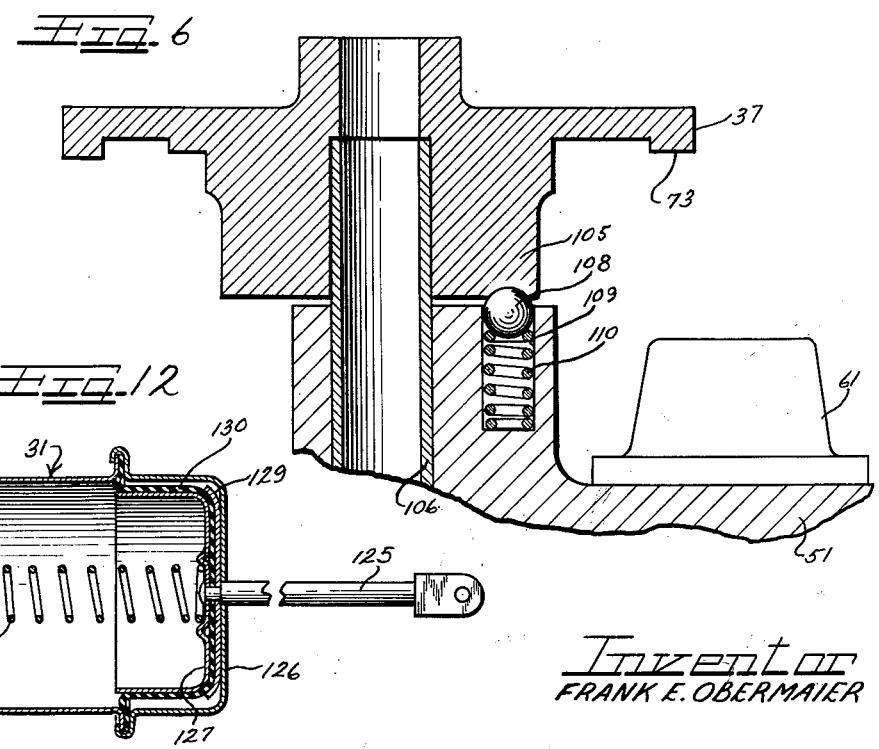
Inventor
FRANK E. OBERMAIER March 26, 1963          F. E. OBERMAIER          3,082,955
SELECTIVE AUTOMOTIVE VACUUM CONTROL VALVE
Filed Dec. 17, 1957                              4 Sheets-Sheet 4
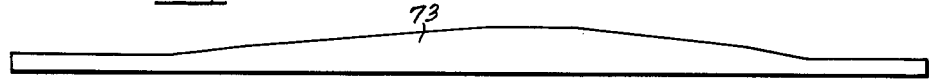
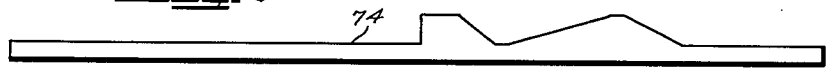
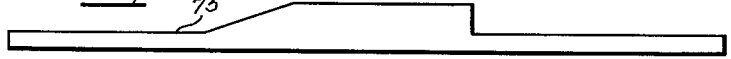
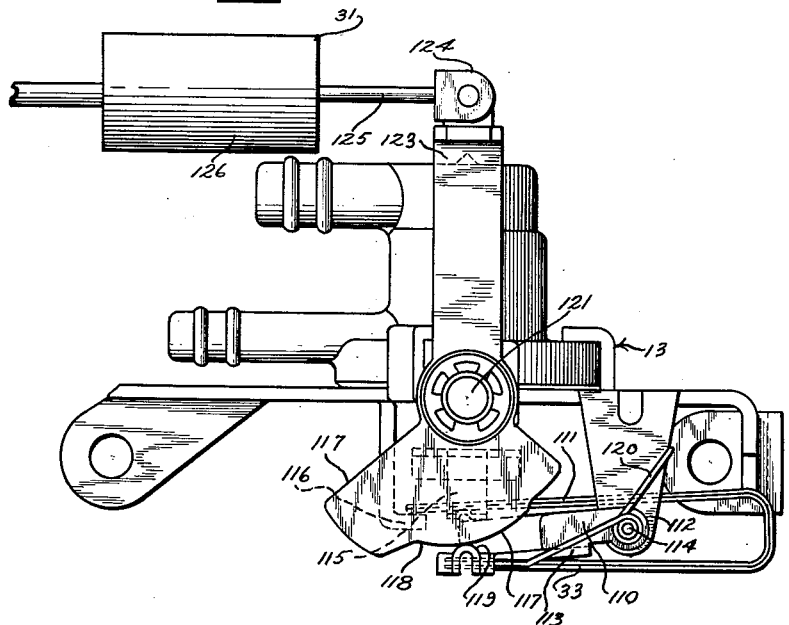
Inventor
FRANK E. OBERMAIER United States Patent Office 3,082,955
Patented Mar. 26, 1963

3,082,955
SELECTIVE AUTOMOTIVE VACUUM CONTROL VALVE
Frank E. Obermaier, Oak Park, Ill., assignor to The Dole Valve Company, Morton Grove, Ill., a corporation of Illinois
Filed Dec. 17, 1957, Ser. No. 703,355
1 Claim. (Cl. 237—2)

This invention relates to improvements in control devices and more particularly relates to fluid flow control devices for effecting a plurality of independent operations.

A principal object of the invention is to provide a novel and improved form of flow control device so constructed and arranged as to effect a plurality of independent operations, one operation of which is a thermostatic adjustment operation.

Another object of the invention is to provide a novel and improved form of distributor valve in which a plurality of valves are operated by a single dial knob, and in which one of valves performs a temperature adjustment operation independently of the other operations.

A still further object of the invention is to provide an efficient form of flow control device supplying vacuum to the valves and control dampers of an automotive heating and ventilating system, and eliminating the Bowden wires heretofore used for this purpose.

A still further object of the invention is to provide a control package eliminating the Bowden wires heretofore used to actuate the dampers and valves of an automotive heating and ventilating system, and employing vacuum to actuate the dampers and valves and adjust the temperature of operation thereof, all under the control of a single knob.

A still further object of the invention is to provide a combination manually and thermostatically operated heater control system utilizing vacuum motors to operate the dampers of the system and to adjust the temperature of operation of the hot water flow control valve of the heater, all under the control of the single knob so arranged as to effect the performance of the damping control and temperature control operations independently of each other by the operation of a single knob.

These and other objects of the invention will appear from time to time as the following specification proceeds and with reference to the accompanying drawings wherein:

FIGURE 1 is a diagrammatic view, diagrammatically illustrating a heater control system in which the heating ventilating and defrosting operations are controlled in accordance with the principles of the present invention;

FIGURE 2 is a plan view of a vacuum control distributor valve constructed in accordance with the invention, with the dial knob broken away;

FIGURE 3 is a fragmentary sectional view taken substantially along line III—III of FIGURE 2;

FIGURE 4 is a horizontal sectional view taken through the manifold of the valve body supplying vacuum to the vacuum control valves, substantially in the general plane of line IV—IV of FIGURE 3;

FIGURE 5 is a bottom plan view of the dial knob;

FIGURE 6 is a sectional view taken substantially along line VI—VI of FIGURE 5;

FIGURES 7, 8, 9 and 10 are profile views of the control cams on the dial knob;

FIGURE 11 is a diagrammatic view diagrammatically showing the temperature adjustment for the thermostatically operated heater control valve; and FIGURE 12 is a cross-sectional view taken through the temperature adjustment damper motor used in the system.

In the embodiment of the invention illustrated in the drawings, I have diagrammatically shown in FIGURE 1 an illustrative form of heating and ventilating system for an automotive vehicle controlled in accordance with the principles of the present invention. The heating and ventilating system is shown as including a heater duct 10 having a heater core 11 therein. The heater core 11 may be of a well known form supplied with hot water from the cooling system of the automotive vehicle under the control of a vacuum operated flow control valve 12, operated by a thermostatic vacuum control valve 13 like that shown and described in my application Serial No. 567,126, filed February 23, 1956, now Patent Number 2,962,047 and no part of the present invention so not herein shown or described in detail.

The heater duct also has a blower 15 therein which may be operated by the usual reversible motor (not shown) and has a damper 16 therein controlling the flow of outside air into the passenger compartment of the automotive vehicle. The damper 16 is biased into a closed position by a spring 17 and is opened by operation of a vacuum motor 19, like the motor shown in FIGURE 12 of the drawings.

The duct 10 also has a defroster duct 20 therein and leading therefrom, having a damper 21 therein biased in a closed position by a spring 22 and opened by operation of a vacuum motor 23.

I have also shown ventilating ducts 24 and 25 for the left and right hand sides of the passenger compartment of the automotive vehicle having dampers 26 and 27 in the respective of said ducts, spring biased in closed positions and opened by operation of vacuum motors 29 and 30 respectively.

I have further shown a vacuum motor 31 for changing the temperature adjustment of a bimetal thermal element 33 controlling the temperature of operation of the vacuum control valve 13 and supplying vacuum through a vacuum line 35 to the vacuum flow control valve 12 to operate said valve.

I have further shown a vacuum regulator valve 36 operated by a dial knob 37, and having a manifold 39 having a vacuum input 40 connected with a source of vacuum, such as the manifold of the automotive vehicle, through a vacuum line 41.

Vacuum lines 43 and 44 are shown as being connected to the respective vacuum motors 29 and 30 to independently supply vacuum to said motors to operate said motors to open either or both of the dampers 26 and 27. A vacuum line 45 is shown as being connected from the manifold 39 to the vacuum motor 23 to operate said motor to open the damper 21 to defrost the windshield, a fourth vacuum line 46 is shown as leading from the manifold 39 and having connection with the vacuum motor 31 to adjust the temperature of operation of the thermostatic vacuum control valve 13, and to supply vacuum to the vacuum motor 19 to operate the damper 16 to open the heater duct 10 to outside air, to accommodate outside air to be drawn through the heater core 11 and discharged through an opening 47 in the heater duct 10, to heat the passenger compartment of the automotive vehicle, all under the control of the dial knob 37. The vacuum motors 29, 30 and 31 are connected with the respective devices to be operated by means of operator members in the form of rods generally shown in FIGURES 1, 11 and 12.

Referring now in particular to the vacuum distributor and control valve 36, operated by the dial plate 37, as shown in FIGURES 2, 3 and 4, the valve 36 is shown as including a valve body 50 having a lower body part 51, herein shown as having passageways 53 and 54 leading therealong from the inlet 40, and shown as extending at right angles with respect to each other. The passageway 53 has communication with valve chambers 55 and 56. The passageway 54 likewise has communication with aligned valve chambers 57 and 59. The valve body 50 also includes an upper body part 61 sealed to said lower body part in a suitable manner and suitably secured thereto by machine screws 62.

The valve chambers 55, 56, 57 and 59 in the valve body 50 (FIGURES 3 and 4) have vacuum control or modulator valves 64, 63, 65 and 66 respectively therein (FIGURES 2 and 3), each of which valves is of a similar construction, so one only need herein be shown or described in detail. The respective valves 63, 64, 65 and 66 are operated by rocking levers 69, 70, 71 and 72 having engaging or follower ends 69a 70a, 71a and 72a, respectively, which are spaced radially with respect to the axis of turning movement of the dial knob 37 at increased radial spacings from follower end 72a to the follower end 69, to accommodate the operation of said operating levers by individual cams 73, 74, 75 and 76 having operative engagement with the follower ends of the respective levers 69, 70, 71 and 72, as will hereinafter be more clearly described as this specification proceeds.

The vacuum control or modulator valve 66, shown in FIGURE 3, is similar to that shown and described in my application Serial No. 567,126, filed February 23, 1956, now Patent No. 2,962,047, dated November 29, 1960, except the valve is cam rather than thermostatically operated. The valve 66 includes a diaphragm 79 extending over the upper end of the valve chamber 59 and having an annular rib 80 recessed within an annular recess 81 extending about the valve chamber 59 and sealed thereto by the upper body part 61. The valve 66 also includes a check valve 83 mounted in the lower end of the valve chamber and having a central passageway 84 leading therethrough, the lower end of which is in communication with the vacuum input 40 and the upper end of which passageway has communication with a vacuum chamber 85 communicating with a vacuum output 86 connected with the vacuum line 44 for operating the vacuum motor 30.

The check valve 83 is like that shown in my prior application Serial No. 567,126, now Patent No. 2,962,047, so need not herein be described in detail except to mention that the passageway 84 is elongated at its lower end portion and has a pin 87 extending thereacross and retained in position by stops (not shown). The walls of the elongated portion of the passageway normally engage the pin 87, to prevent the passage of air at atmospheric pressure into the lower part of the chamber 59.

The walls of the elongated portion of the passageway, however, will spread apart to accommodate the passage of air through the passageway 84 from the vacuum chamber 85 when the vacuum in the passageway 54 and the lower part of the valve chamber 59 is greater than the vacuum in the vacuum chamber 85. Thus, when the vacuum in the passageway 54 is less than the vacuum in the vacuum chamber 85, the increased pressure on the outer wall of the elongated portion of the check valve will force the wall into engagement with the pin 87 and hold vacuum within the chamber 85 as in my prior application Serial Number 567,126, now Patent No. 2,962,047.

The diaphragm 79 has a central thickened generally cylindrical portion having a port 90 leading therethrough, concentric with the center thereof, and having an inwardly extending annular wall 91 encircling the port 90, the inner margin of which wall forms a seat for a spring 93, biasing a valve 94 into engagement with the outer end of the port 90. The valve 94 is on the outer end of a stem 95 the opposite end of which has a valve 96 formed thereon, engageable with the inner end of the passageway 84 through the check valve 83.

Thus, when it is desired to supply vacuum to the vacuum input 86 through the check valve 83 the diaphragm 79 may be lifted, to lift the valve 96 off of its seat and open the passageway 84 to the vacuum chamber 85. As, however, the vacuum in the vacuum chamber 85 may reach a predetermined value, the vacuum within said vacuum chamber will move the diaphragm 79 inwardly against a spring 97, to open the valve 94 and accommodate air at atmospheric pressure to flow through the port 90 into the vacuum chamber 85 until the vacuum within said chamber is equalized to the extent necessary to again balance the diaphragm 79 effect closing of the valve 94 by the bias of the spring 93.

The spring 97 is shown as being connected at its outer end to a hook-like portion 99 at the opposite end of the operating lever 72 from the follower end 72a thereof. The opposite end of the spring 97 is shown as extending through a cross member 100 of a yoke 101, having an annular collar 103 extending about the central thickened portion of the diaphragm 79 and engaging a flanged portion 104 of said central thickened portion. The operating lever 72 and spring 97 thus form an adjustable means for adjusting the vacuum control valve 66 and determining the vacuum input of said valve. Similar springs connect the operating levers 69, 70 and 71 with the vacuum control valves 63, 64 and 65 and with said levers form an adjustble means therefor.

Thus, upon operation of the lever 72 in a direction, which in FIGURE 3 is shown as being a counter clockwise direction as the cam 76 is engaged with the follower end 72a of said lever, the diaphragm 79 will be extended to move the valve 96 out of engagement with the passageway 84 and connect the chamber 85 to a source of vacuum.

It should here be understood, however, that the vacuum in the vacuum chamber 85 may be maintained at a high or a low vacuum dependent upon the extent the diaphragm 79 is extended outwardly with respect to said vacuum chamber, and that a variation in vacuum may be attained by the cam 76. That is, the higher the rise of the cam 76 the greater will be the vacuum required to move the diaphragm 79 inwardly and open the port 90 to atmosphere.

Thus, the vacuum motors in the heater control system may operate at varying vacuums dependent upon the positions of the engaging or follower ends of the operating levers therefor on their individual cams, and upon the rises of the indivenual cams.

It will here be noted from FIGURE 7 that the rise of the cam 73 is gradual and rises for one-third the rotatable movement of the dial knob 37. Thus, as the dial knob 37 is rotated in a direction, which is shown in FIGURES 1 and 2 as being a counter clockwise direction, an increasing amount of vacuum will be supplied to the vacuum motor 31 to increase the tension of the bimetal thermostatic element 33 and the temperature of operation of the valve 13, to supply vacuum to the vacuum control valve 12, controlling the supply of hot water to the heater core 11. The cam 73 thus acts as a temperature adjustment cam by varying the vacuum supplied to the motor 31 adjusting the tension of the bimetal thermostatic element 33.

The cams 74, 75 and 76 are shown as having cam profiles for effecting the operation of their respective vacuum modulator valves in accordance with the position of the dial knob 37 with respect to its off position.

It should here be undestood that the cams may be arranged in various manners and may be so arranged as to operate the desired ducts either independently or simultaneously of each other as desired.

The dial plate 37 is shown as having a hub 105 mounted on a hollow shaft 106 journaled in the valve body 50. The hub 105 is shown as having a plurality of detent recesses 107 on its undersurface engaged by a detent ball 108 mounted in a upwardly opening spring chamber 109. The ball 108 is biased into engagement with the undersurface of the hub 105 and the detent recesses 107 therein by a spring 110 seated in said spring chamber. The detent ball 108 is thus provided to index the positions of the dial plate 37 and the selective control positions thereof, for effecting the selected operation or operations.

In FIGURE 11, I have shown the vacuum control valve 13 controlling the supply of vacuum to the vacuum operated flow control valve 12 in a more or less diagrammatic form in order to illustrate the manner in which the temperature may be adjusted by the vacuum motor 31. The vacuum control valve 13 is like the vacuum control valve shown and described in my Patent No. 2,962,047, and the method of adjusting the temperature of operation of said valve is the same as in my aforementioned patent. The valve itself also operates on principles similar to the principles of operation of valve 66 so the valve need not herein be shown or described except insofar as is necessary to describe the temperature adjustment of said vacuum control valve by the vacuum motor 31.

The bi-metal thermal element 33 operating the vacuum control valve 31 is generally U-shaped in form with its high expanding side on the inside of the element. Thus, upon increases in temperature an inner leg 111 of the thermal element will move toward the body of the valve to vent the valve to atmosphere and close the valve to vacuum. The bi-metal thermal element 33 is shown as being pivotally mounted on spaced ears 112 by means of a bracket member 113 extending along the outer leg of the thermal element toward the closed end thereof and pivotally mounted between the ears 112 on a pivot pin 114. The inner leg 111 of the bi-metal thermal element extends within a yoke 115 for operating the valve 13, and abuts a stop 116 at its outer end, maintaining tension on the thermal element 33 in accordance with the position of an adjusting cam 117 therefor.

The cam 117 has a camming face 118 engaging a follower face 119 on the bracket member 113. A torsion spring 120 biases the follower face 119 of the bracket member 113 into engagement with the camming face 118 of the cam 117. The cam 117 is mounted on a pivot pin 121 extending from the body of the valve 13 and has an arm 123 extending therefrom in an opposite direction from the cam 117. The arm 123 is shown as being pivotally connected to a yoke 124 extending from an operator member in the form of a rod 125 guided within a casing 126 of the vacuum motor 31. The rod 125 is shown in FIGURE 12 as extending through spaced diaphragm plates 127 and 129, extending along opposite sides of a flexible diaphragm 130, and as being riveted or otherwise secured thereto. A spring 133 is shown as biasing the diaphragm 130 and rod 125 in the extended position shown in FIGURE 12. The casing 126 on the opposite side of the diaphragm 130 from the spring 133 is vented to atmosphere along the rod 125, there being a loose connection between said casing and rod to accommodate free movement of said rod with respect to said casing.

Thus, upon the connection of the vacuum motor 31 to a source of vacuum by operation of the vacuum control or modulator valve 63, when the vacuum is greater than the force exerted by the spring 133, the rod 125 will be retractibly moved within the casing 126 of the vacuum motor 31 until the vacuum balances the spring pressure. This will pivot the cam 117 in a direction, which in FIGURE 11 is shown as being a counterclockwise direction. As the cam 117 is moved in a counterclockwise direction the force against which the leg 111 of the bi-metal thermal element 33 bears against the stop 116 will be increased, with the result that the temperature at which the valve 13 is vented to atmosphere and closed to the input of vacuum is increased. This in turn will result in the operation of the vacuum operated flow control valve 12, to increase the flow of hot water through the heater. As the cam 117 moves in a clockwise direction, effected by a reduction in vacuum in the vacuum motor 31 the end of the leg 111 will move away from the stop 116, resulting in a shorter travel of the thermal element to vent the valve 13 to atmosphere and to reduce the vacuum effective to operate the vacuum operated flow control valve 12. This will lower the temperature range at which the valve 13 is vented to atmosphere and thus reduce the flow of hot water to the heater core 11.

It should here be understood that the cam 73 operates to vary the vacuum supplied to the vacuum motor 31 and that the more the dial plate 37 is turned to move the follower end of the operating lever 69 along the rise of the cam 73, the greater will be the vacuum supplied to the vacuum motor 31, and the higher will be the temperature at which the vacuum control valve 13 is vented to atmosphere, to reduce the flow of hot water through the heater. The valve 63 thus acts as a temperature adjustment valve for varying the adjustment of the thermostatic element 33, with a resultant varying in the temperature at which the valve 13 will operate to reduce the flow of vacuum to the vacuum control valve 12 and reduce the flow of hot water through the heater.

It may further be seen that the control device of my invention not only serves as a temperature adjustment device for adjusting the temperature of the interior of an automobile vehicle, but also serves to operate the various ventilating dampers, air inlet damper for the heater, and defroster in a selected sequence either simultaneously or independently of each other as required and thus acts as a combination manually operated and thermostatically operated flow control device, adjusting temperature and effecting the operation of a series of devices, all by the operation of one dial plate.

It should here be understood that while I have described the control device and system of my invention as controlling the heater of an automotive vehicle, that it may also control other devices, such as the operation of the air conditioner of an automotive vehicle as well as the operation of the air conditioner and heater when desired.

While I have herein shown and described one form in which my invention may be embodied, it will be understood that various modifications and variations of the invention may be effected without departing from the spirit and scope of the novel concepts thereof as defined by the claim appended hereto.

I claim as my invention:

In a vacuum control system for car heaters and the like, a source of vacuum including a manifold, an air ventilating duct having a damper therein, a heater duct having a damper therein, a defroster duct having a damper therein, a heater core associated with said heater and defroster ducts, a flow control valve controlling the passage of hot water through said heater core, a valve body having a plurality of valve chambers therein, individual fluid connections from said manifold to said valve chambers, a vacuum control valve in each valve chamber, a thermostat for operating said flow control valve, a vacuum motor for changing the setting of said thermostat and varying the temperature of operation of said flow control valve, one vacuum control valve having fluid connection with said vacuum motor and operable to vary the vacuum to said vacuum motor to change the temperature of operation of said flow control valve, individual vacuum motors for operating said dampers, fluid connections from the other of said vacuum control valves to associated individual vacuum motors for operating said dampers, a single control knob and individual cam means operated by said knob and associated with each vacuum control valve to operate said valves to effect the supply of vacuum to said vacuum motors for adjusting the temperature of operation of said flow control valve and the flow of water through said heater core, and also operable to selectively operate said other vacuum control valves and supply vacuum to said individual motors to effect operation of said dampers in a selected sequence and to effect adjustment of the temperature of operation of said vacuum control valve.

References Cited in the file of this patent

UNITED STATES PATENTS

| | | |
|---|---|---|
| 1,390,662 | Wittig | Sept. 13, 1921 |
| 1,538,167 | Chappell et al. | May 19, 1925 |
| 1,745,707 | Perrett | Feb. 4, 1930 |
| 2,387,008 | Buchanan | Oct. 16, 1945 |
| 2,445,392 | Findley | July 20, 1948 |
| 2,529,875 | Howard | Nov. 14, 1950 |
| 2,612,829 | Joyce | Oct. 7, 1952 |
| 2,625,429 | Coles | Jan. 13, 1953 |
| 2,634,670 | Simons | Apr. 14, 1953 |
| 2,668,014 | Lund | Feb. 2, 1954 |
| 2,706,084 | Gess | Apr. 12, 1955 |
| 2,707,079 | Little et al. | Apr. 26, 1955 |
| 2,929,310 | Getz | Mar. 22, 1960 |
| 2,963,954 | Baker | Dec. 13, 1960 |